May 10, 1932.  T. L. ROBINSON  1,857,823
RETAINER FOR BALL BEARINGS
Filed June 27, 1929  2 Sheets-Sheet 1
Fig. 1.
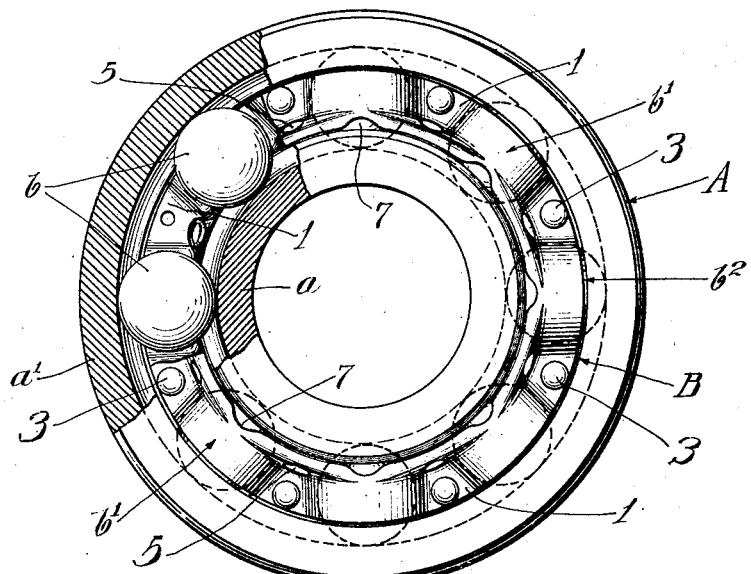
Fig. 2.
Fig. 3.
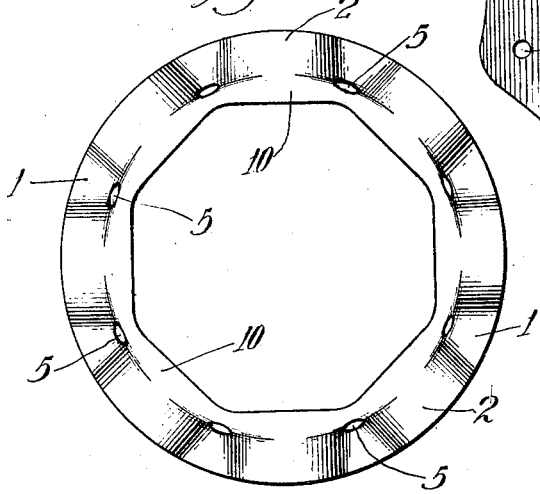
Inventor
Thomas L. Robinson,
By Geo. E. Waldo,
Attorney.

May 10, 1932.  T. L. ROBINSON  1,857,823
RETAINER FOR BALL BEARINGS
Filed June 27, 1929   2 Sheets-Sheet 2

Inventor
Thomas L. Robinson,
By Geo. E. Waldo
Attorney.

Patented May 10, 1932

1,857,823

UNITED STATES PATENT OFFICE

THOMAS L. ROBINSON, OF VALPARAISO, INDIANA

RETAINER FOR BALL BEARINGS

Application filed June 27, 1929. Serial No. 374,190.

This invention relates to ball retainers for ball bearings of the general type consisting of two substantially duplicate parts or halves, each comprising alternately arranged radially disposed web portions and pocket-forming segments, the web portions of different parts being connected to form a unitary structure with the pocket-forming segments thereof, disposed in complementary relation to form the ball pockets.

Ball retainers embodying my invention and improvements preferably will be stamped from suitable sheet metal.

As the invention relates to improvements in ball retainers, the object of the invention is to provide a new and novel retainer of the general type specified, which will be simple in construction, strong and durable; and to this end I connect the walls of the ball pockets adjacent their inner ends by laterally disposed strengthening webs.

The invention also comprises the various other features and details of construction hereinafter described and claimed.

In the accompanying drawings, in which my invention is fully illustrated—

Fig. 1 is a side view of a ball bearing comprising a ball retainer embodying my invention and improvements;

Fig. 2 is a face view of a stamped sheet metal blank adapted for making parts of my improved ball retainer in accordance with my improved process of stamping;

Fig. 3 is a detached face view showing the blank as deformed by the first blanking operation;

Figure 4:
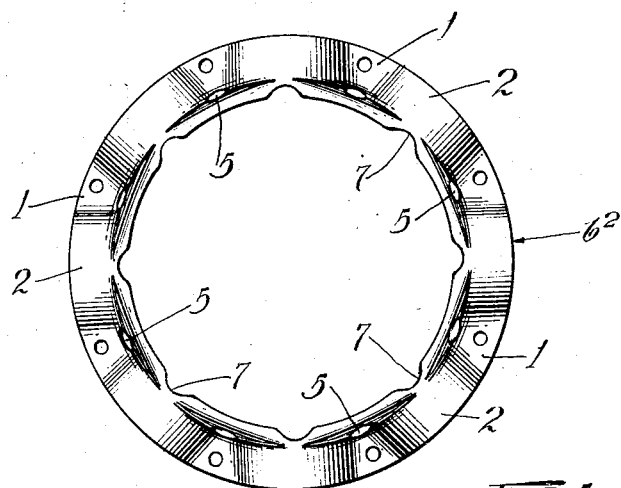
Fig. 4 is a view of the completely formed retainer part, substantially similar to Fig. 2, showing the retainer part as trimmed in the final step of the process.
Figure 6:
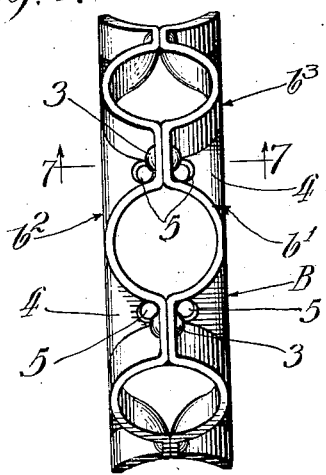
Fig. 6 is a fragmentary view, corresponding substantially to Fig. 5, of a finished retainer of my invention.
Figure 5:
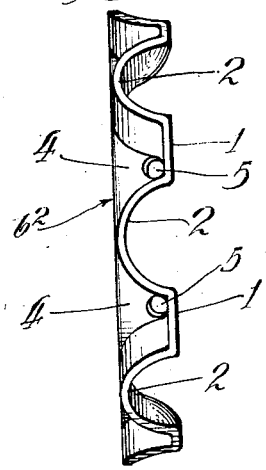
Fig. 5 is a fragmentary view from the right side of Fig. 4.

Describing the invention with particular reference to the drawings and referring particularly, in the first instance, to Figs. 1, 4, 5, 6 and 7, A designates the bearing as a whole, $a$, $a'$ the inner and outer bearing members, respectively, B the ball retainer as a whole, $b$ the anti-friction balls and $b'$ the ball pockets as a whole, in which said balls are confined.

As regards its usual features and except as hereinafter particularly described and pointed out, my improved bearing, including the ball retainer B, may be of any usual or approved construction and will readily be understood by persons familiar with the art from an examination of the drawings without a description thereof in detail.

In accordance with my invention as it relates to improvements in ball retainers, the ball retainer B consists of two substantially duplicate parts, $b^2$, $b^3$, each comprising alternately arranged flat webs 1 and pocket-forming segments 2, the flat faces of the webs 1 and the axes of the pocket-forming segments 2 being disposed radially. The parts $b^2$, $b^3$ of the retainer are secured together to form a unitary structure—to wit: the retainer B—with the pocket-forming segments in complementary relation by rivets 3 or other suitable means, in a familiar manner.

As shown, the ball pockets $b'$ are substantially cylindrical, and, as stated, the axes thereof extend substantially radially of the bearing, and said ball pockets are reinforced and strengthened by webs 4 which connect the walls of adjacent ball pockets adjacent their inner ends.

In accordance with the accepted practice, I prefer to use antifriction balls of maximum size consistent with the size of the bearing and also to so proportion the ball retainer that no part thereof shall extend beyond the lateral faces of the bearing members $a$, $a'$. To effect these ends, the outside diameter of the ball pockets is made substantially equal to the axial dimension of the bearing members, and the outer edges of the strengthening webs 4 are substantially flush with or tangent to the outer surface of the walls of the ball pockets which they connect, respectively. As shown, also, in the finished retainer, the inner edges of the webs 4 are spaced from the webs 1, thus providing holes 5 between the proximate edges of the webs 1 and 4, which not only greatly facilitate cleaning of the bearings, but also—where the ball retainers are formed from sheet metal by stamping methods—render it possible to deform the blanks from which the retainer parts $b^2$, $b^3$ are made, including the webs 4, by a single stamping operation, without rupturing the metal, all tendency to rupture being compensated for by stretching of the metal around the holes in said blanks, as will presently appear.

Where the ball pockets are substantially cylindrical, it is obvious that, due to convergence of the pockets inwardly, any considerable radial play or movement of the ball retainer B—which would result if the interior and exterior dimensions of the retainer were appreciably larger and smaller, respectively, than the exterior and interior diameters, respectively, of the inner and outer bearing members—would exert a wedging action on the balls when passing over the top sides of the bearings, which in turn would cause wear, both of said balls and of the walls of the ball pockets, which would be very objectionable.

As shown in the drawings of the present application, the ball retainer B "pilots" on the inner bearing member, and to obviate the foregoing objectionable feature, the inner edges of the webs 4—which define the opening in the ball cage or retainer in which, when the bearing is assembled, the inner bearing member $a$ is positioned—are trimmed to provide an opening of such size that a circle of maximum diameter inscribed therein will receive said inner bearing member with only slight clearance, whereby radial play or movement of the ball retainer and resultant wear of the balls and of the walls of the ball pockets will be prevented.

A common method of washing or cleaning ball bearings is to immerse the assembled bearing in a bath of oil or other suitable washing liquid and, while so immersed, to rotate the inner an outer bearing members relative to each other, preferably quite rapidly, thus causing the oil or other liquid to circulate through the bearing and to wash out all gritty particles, small metal chips, and other dirt which may have lodged in the bearing, particularly in the ball pockets and the ball races in the bearing members.

In accordance with my invention, I attain the object of the invention, as it relates to facilitating the washing of the bearings, by providing openings and passageways which, in association with the openings 5 formed at the juncture of the webs 1 and 4, will cause the oil to circulate freely through all parts of the bearing when the bearing members $a$, $a'$ are rotated relatively to each other at any considerable speed.

As shown, said circulation openings and passageways, in addition to the holes 5, comprise circumferential passageways 6 which connect adjacent ball pockets $b'$, positioned in circumferential alignment with the centers of said ball pockets, and by notching out the lower, lateral edges of the ball pockets to form holes or openings 7 in their inner ends to permit the passage of washing liquid into or out of the ball pockets, as the case may be.

Figure 7:
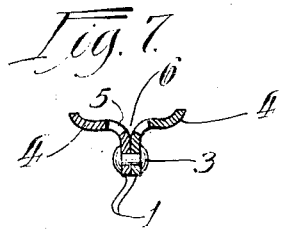
Fig. 7 is a detail sectional view on the line 7—7 of Fig. 6.

As shown, the circumferential passageways 6 are formed by crowning the webs 4 throughout their width from their outer edges to their juncture with the webs 1 and the pocket-forming segments 2—substantially as shown in Fig. 7. As also clearly appears from said Fig. 7, it is obvious that with the construction described, when the retainer parts are assembled, the remote edges only of the webs 4 will define the central opening in the finished retainer and will bear upon the inner bearing member.

Obviously, the holes 5 and 7 and the passageways 6 will also provide for effectively lubricating the bearings.

My improved ball retainer may readily be formed from sheet metal by stamping dies, and the retainer shown in the drawings is particularly designed and adapted to be formed in this manner, and in Figs. 2, 3 and 4 of the drawings I have shown a blank for forming the separate parts $b^2$, $b^3$ of the retainer and also illustrating the manner of forming and finishing said parts in accordance with my improved process of manufacture.

Describing my improved process with particular reference to said Figs. 2, 3 and 4, A' designates the blank as a whole, formed in which, by the initial blanking process, is a central opening 8 and holes 5', said holes forming a symmetrical series around the blank and being positioned between the portions of the blank which are designed to form the radially disposed webs 1 and the strengthening webs 4 which connect the walls of the ball pockets adjacent their inner ends, as explained. The outer edge of the blank A' may be described generally as forming a regular polygon, the angular portions 1' thereof being in radial alignment with the holes 5' and the sides 9 of the polygon merging into the angular portions 1'. As shown, said angles 1' of the polygon are rounded, and the sides 9 thereof are inwardly concave on a long radius, the relation being such that a desired contour will be imparted to the parts $b^2$, $b^3$ of the retainer and to the retainer itself, formed by securing said parts together. Obviously the contour of the outer edges of the blank A' admits of variation within considerable limits, the angles 1' being made more or less blunt and the sides 9 approximating straight lines more or less closely, according to the judgment of the designer. Always, however, it will be necessary to so proportion the blank that all parts of the finished retainer will fit within the outer bearing member with desired clearance. In practice, a desirable relation is such that the contour of the periphery of the finished cage will be circular as near as may be. The portions of the blank at the angles 1' thereof form the webs 1 of the parts $b^2$, $b^3$ of the retainer; the portions of the blank intermediate said angular web-forming portions, the ball-pocket segments; and the portions of the blank positioned intermediate the portions thereof which form said ball-pocket segments and also between the holes 5' and the edge of the opening 8, the webs 4, which connect the walls of the ball-pocket segments at their inner ends.

In accordance with my improved process of manufacture, deformation of the blank A' to form the parts $b^2$, $b^3$ of the ball retainer, including the outer marginal webs 1, the ball-pockets segments 2 and the webs 4 which connect the ball-pocket segments adjacent their inner ends, is effected by a single stamping operation, the blank being supported by parts of the lower die upon which rest the angular portions 1' of the blank which form the web portions 1, the portion of the blank intermediate said web-forming portions being struck downwardly from the plane of the blank to form the ball-pocket segments 2, and the portions 4' of the blank between the holes 5' and the edge of the central opening 8, being struck downwardly from the plane of the blank to form the webs 4 which connect the inner ends of the ball-pocket segments, said webs being bent downwardly, substantially at right-angles to the initial plane of the blank but with their extreme inner edges substantially parallel with the initial plane of the blank. The initial size of the opening 8 in the blank A' is somewhat smaller than the contemplated final size thereof, and in the deformation of the blank to form the webs 1, the ball-pocket segments 2, and the webs 4, a fin 10 is formed on the blank surrounding the central opening 8, as clearly shown in Fig. 3.

Deformation of the blank A' to form the webs 4 without causing rupture of the metal between the webs 1 and the webs 4, is greatly simplified and in fact rendered possible by providing the holes 5' in the blanks, said holes permitting stretching of the metal at their edges to obviate what otherwise would develop stresses in the metal tending to tear or rupture it, thus necessitating deformation of the blank in several stages and by the use of several sets of forming dies, instead of in a single stage or operation and a single set of forming dies, as is rendered possible by my improved process in providing the holes 5' prior to deformation of the blanks.

Following deformation of the blanks to the form shown in Fig. 3, they are subjected to the action of trimming or broaching dies by means of which the central opening 8 is brought to desired size and shape, and the ends of the ball-pocket segments connected by the webs 4 notched out to form the openings 7, substantially as shown in Fig. 4 and as heretofore described.

Having the retainer parts $b^2$, $b^3$, which are duplicates of each other, a finished ball cage or retainer is formed by securing two of said retainer parts together with the ball-pocket segments 2 thereof in complementary relation. As shown and as heretofore described, said cage parts are secured together by the rivets 3, suitable holes being formed in the webs 1 to receive said rivets. However, the means for connecting the retainer parts $b^2$ $b^3$ together forms no part of my present invention, and I do not, therefore, desire to limit myself to the use of the particular means shown or to any particular means for securing the webs 1 together, my invention contemplating the use of any desired means for this purpose. Also where, as shown, the webs 1 are connected by rivets, the rivet holes may be formed and the riveting done in accordance with usual or any desired practice. Neither the formation of the rivet holes nor the riveting operation forms any part of the present invention, as it relates to an improved process of manufacture. Naturally, the riveting operation will be the final step in the manufacture of the retainers, but my invention contemplates forming the rivet holes in any desired sequence relative to the performance of the other steps or operations which constitute my improved process.

I claim:

1. A ball retainer for a ball bearing stamped from flat blanks of suitable sheet metal, comprising two substantially duplicate integral parts, each provided with a central opening and consisting of alternately arranged pocket-forming segments and radially disposed webs, the webs of different retainer parts being rigidly connected to form a unitary structure with the pocket-forming segments of connected parts in complementary relation, said retainer parts also comprising strengthening webs which connect the inner ends of the walls of adjacent pocket-forming segments, said retainer also comprising crowned strengthening webs which connect the inner ends of the ball-pockets forming circumferential passageways which connect the ball-pockets of the retainer in series, and the remote edges only of which define the bearing opening of the retainer on the inner bearing member.

2. A ball retainer as specified in claim 1, in which the ball-pockets are substantially cylindrical and extend substantially radially of the bearing, the axial dimension of the retainer being substantially equal to that of the bearing members, thus providing for the use of ball-pockets and balls of maximum size with all parts of the retainer housed by the bearing members, the remote edges only of the strengthening webs defining the central opening in the retainer and said opening being proportioned to fit the inner bearing member with only slight clearance, whereby wedging of the balls in the ball pockets in operation will be prevented.

3. A ball retainer as specified in claim 1, in which the ball-pockets are substantially cylindrical and extend substantially radially of the bearing, the central bearing opening of the retainer being proportioned to fit the inner bearing member with only slight clearance and the retainer being provided with notches in the inner ends of the ball-pockets positioned substantially in line with the circumferential centers thereof, forming openings which communicate with the inner ends of said ball pockets when the bearing is assembled.

4. A ball retainer as specified in claim 1, in which the radially disposed webs for connecting the retainer parts and the strengthening webs which connect the inner ends of the pocket-forming segments are disposed at angles to each other approximating right angles, said retainer being provided with holes or openings at the juncture of said radially disposed and strengthening webs.

In witness that I claim the foregoing as my invention, I affix my signature this 18th day of June, 1929.

THOMAS L. ROBINSON.